Patented Jan. 21, 1947

2,414,706

UNITED STATES PATENT OFFICE 2,414,706

METHODS FOR PRODUCTION OF ALKALI METAL TRIFLUORACETATE

Jesse H. Babcock and Alexander D. Kischitz, Niagara Falls, N. Y., assignors to Hooker Electrochemical Company, Niagara Falls, N. Y., a corporation of New York No Drawing. Application May 14, 1945, Serial No. 593,760

6 Claims. (Cl. 260—539)

Our process relates to production of alkali metal trifluoracetate by oxidation of hexafluordihalobutene, produced in accordance with the process of co-pending application Serial Number 593,775, filed simultaneously herewith. The alkali metal trifluoracetate may then be used as such or converted to trifluoracetic acid, which may be esterified.

It is known that potassium trifluoracetate may be made by oxidation of trifluorotrichlorpropene, in accordance with the following reaction:

$$3CF_3CCl:CCl_2 + 4KMnO_4 + 8NaOH$$
$$\rightarrow 3CF_3COONa + 4MnO_2 + 4KCl +$$
$$5NaCl + 3CO_2 + 4H_2O \quad (1)$$

We have now discovered that alkali metal trifluoracetate may be advantageously produced by oxidation of hexafluordichlorbutene or heptafluormonochlorbutene, in accordance with the following reactions:

$$3CF_3CCl:CClCF_3 + 4KMnO_4 + 8NaOH$$
$$\rightarrow 6CF_3COONa + 4MnO_2 + 4KCl +$$
$$2NaCl + 4H_2O \quad (2)$$

$$3CF_3CF:CClCF_3 + 4KMnO_4 + 8NaOH$$
$$\rightarrow 6CF_3COONa + 4MnO_2 + KF +$$
$$3KCl + 2NaCl + 4H_2O \quad (3)$$

It will be noted that in Reaction 1, one molecule of product is produced per molecule of organic material, whereas in Reactions 2 and 3 two molecules of product are produced per molecule of organic material. Also, it is of interest to note that in Reactions 2 and 3 the oxygen is derived in part from the oxidizing agent and in part from the caustic alkali.

Example

The potassium permanganate and an aqueous solution of the sodium hydroxide are charged into a reactor equipped with an agitator, reflux condenser, and means for adding the organic material gradually, such as, in small units, a dropping funnel. The mass is heated to between 80° and 90° C. and addition of the hexafluordichlorbutene started, with agitation. The reaction is quite exothermic and refluxing temperature maintained without supply of external heat. The rate of addition of the organic material is regulated to maintain refluxing. Usually this operation requires about four hours. When the desired quantity of organic material has been added, leaving a slight excess of potassium permanganate, heat is applied and the temperature raised until the water starts to reflux. This temperature is maintained for about two hours. The mass is then cooled and any excess permanganate reduced, as with sodium sulphite. The reaction mixture is filtered to remove manganese dioxide.

The clear filtrate, which is a water solution of sodium trifluoroacetate, potassium chloride, sodium chloride and sulphates, may then be evaporated to dryness and the product extracted with absolute alcohol. The inorganic salts, being insoluble in absolute alcohol, are left behind. The alcoholic solution is evaporated to dryness again and sodium trifluoracetate recovered in high purity (e. g. 99 per cent).

Alternatively, if preferred, sulphuric acid may be added to the mixture resulting from the reaction in amount sufficient to convert the sodium trifluoracetate to trifluoracetic acid. This forms with the water present a constant boiling mixture boiling at 105° C. This mixture is thus distilled away from the inorganic salts. The distillate is then carefully neutralized with sodium hydroxide, evaporated to dryness and the sodium trifluoracetate recovered.

The sodium trifluoracetate may then be esterified to ethyl trifluoracetate or other ester in known manner, as follows:

$$2CF_3COONa + H_2SO_4 + 2C_2H_5OH$$
$$\rightarrow 2CF_3COOC_2H_5 + H_2SO_4 + 2H_2O \quad (4)$$

While we have described our process as exemplified by the use of potassium permanganate as the oxidizing agent, any other suitable oxidizing agent may be employed, including free oxygen.

We claim as our invention:

1. The process for production of reaction products of halogenated butenes having three fluorine atoms attached to each primary carbon atom and a halogen of the group consisting of fluorine and chlorine attached to each secondary carbon atoms, with potassium permanganate and caustic alkali, in aqueous solution, which comprises charging one of the reagents into a reactor; raising its temperature to between 80° to 90° C.; adding the other reagent gradually, with agitation, to maintain refluxing by the heat of reaction; continuing the agitation and supplying external heat to maintain refluxing for a further period, until the reaction has gone to substantial completion; and recovering from the reaction mixture a product of the group consisting of trifluoracetic acid and the salt thereof with the caustic alkali.

2. The process for production of reaction products of halogenated butenes, having three fluorine atoms attached to each primary carbon atom and a halogen of the group consisting of fluorine and chlorine attached to each secondary carbon atom, with potassium permanganate and caustic alkali, in aqueous solution, which comprises charging one of the reagents into a reactor; raising its temperature to between 80° to 90° C.; adding the other reagent gradually, with agitation, to maintain refluxing by the heat of reaction; continuing the agitation and supplying external heat to maintain refluxing for a further period, until the reaction has gone to substantial completion; reducing any excess permanganate; removing reduced permanganate; evaporating the solution to dryness; extracting from the solid residue salt of trifluoracetic acid with the caustic alkali; and recovering said salt from the alcohol solution.

3. The process for production of reaction products of halogenated butenes, having three fluorine atoms attached to each primary carbon atom and a halogen of the group consisting of fluorine and chlorine attached to each secondary carbon atom, with potassium permanganate and caustic alkali, in aqueous solution, which comprises charging one of the reagents into a reactor; raising its temperature to between 80° to 90° C.; adding the other reagent gradually, with agitation, to maintain refluxing by the heat of reaction; continuing the agitation and supplying external heat to maintain refluxing for a further period, until the reaction has gone to substantial completion; adding sulphuric acid; and distilling off a constant boiling mixture of water and trifluoracetic acid.

4. The process for production of reaction products of halogenated butenes, having three fluorine atoms attached to each primary carbon atom and a halogen of the group consisting of fluorine and chlorine attached to each secondary carbon atom, with potassium permanganate and caustic alkali, in aqueous solution, which comprises charging the aqueous solution into a reactor; raising its temperature to between 80° to 90° C.; adding the organic reagent gradually, with agitation to maintain refluxing by the heat of reaction; continuing the agitation and supplying external heat to maintain refluxing for a further period until the reaction has gone to substantial completion; and recovering from the reaction mixture a product of the group consisting of trifluoracetic acid and the salt thereof with the caustic alkali.

5. The process for production of reaction products of hexafluorodichlorobutene with potassium permanganate and caustic alkali, in aqueous solution, which comprises charging the aqueous solution into a reactor; raising its temperature to between 80° and 90° C.; adding the organic reagent gradually, with agitation, to maintain refluxing by the heat of reaction; continuing the agitation and supplying external heat to maintain refluxing for a further period, until the reaction has gone to substantial completion; and recovering from the reaction mixture a product of the group consisting of trifluoracetic acid and the salt thereof with the caustic alkali.

6. The process for production of reaction products of heptafluorochlorbutene with potassium permanganate and caustic alkali, in aqueous solution, which comprises charging the aqueous solution into a reactor; raising its temperature to between 80° and 90° C.; adding the organic reagent gradually, with agitation, to maintain refluxing by the heat of reaction; continuing the agitation and supplying external heat to maintain refluxing, for a further period, until the reaction has gone to substantial completion; and recovering from the reaction mixture a product of the group consisting of trifluoracetic acid and the salt thereof with the caustic alkali.

JESSE H. BABCOCK.
ALEXANDER D. KISCHITZ.